United States Patent
MacInnes et al.

(10) Patent No.: US 9,891,793 B2
(45) Date of Patent: Feb. 13, 2018

(54) DISPLAY POSITION OFFSET

(71) Applicant: NCR CORPORATION, Duluth, GA (US)

(72) Inventors: Donald I. MacInnes, Angus (GB); Gordon Dye, Dunfermeline (GB)

(73) Assignee: NCR Corporation, Duluth, GA (US)

( * ) Notice: Subject to any disclaimer, the term of this patent is extended or adjusted under 35 U.S.C. 154(b) by 26 days.

(21) Appl. No.: 13/663,166

(22) Filed: Oct. 29, 2012

(65) Prior Publication Data
US 2014/0118266 A1   May 1, 2014

(51) Int. Cl.
*G06F 3/041* (2006.01)
*G06F 3/0484* (2013.01)
*G06F 3/042* (2006.01)

(52) U.S. Cl.
CPC ........ *G06F 3/04842* (2013.01); *G06F 3/0418* (2013.01); *G06F 3/0425* (2013.01)

(58) Field of Classification Search
CPC ........................................ G06F 3/041–3/04897
See application file for complete search history.

(56) References Cited

U.S. PATENT DOCUMENTS

| 7,227,526 B2 * | 6/2007 | Hildreth et al. .............. 345/156 |
| 2012/0179994 A1 * | 7/2012 | Knowlton et al. ............ 715/779 |
| 2013/0013105 A1 * | 1/2013 | Lutz ...................... G07F 19/205 700/232 |
| 2013/0069880 A1 * | 3/2013 | Stark ............................. 345/168 |
| 2014/0118255 A1 * | 5/2014 | Billerbeck .................... 345/158 |

* cited by examiner

*Primary Examiner* — Matthew Sim
(74) *Attorney, Agent, or Firm* — Schwegman, Lundberg & Woessner

(57) ABSTRACT

A method and apparatus are disclosed for determining a user option selected at a touchscreen. The method includes the steps of determining an observation position of a user of a touchscreen, determining an offset responsive to a difference between the observation position and an expected observation position and determining a user option selected at the touchscreen responsive to the offset.

13 Claims, 6 Drawing Sheets

DISPLAY POSITION OFFSET

FIELD OF THE INVENTION

The present invention relates to a method and apparatus for determining a user option selected at a touchscreen. In particular, but not exclusively, the present invention relates to a method of accurately determining the options selected by a user of a touchscreen of a Self-Service Terminal (SST) regardless of a viewing angle that the user has of the touchscreen.

Many situations are known in which Self-Service Terminals (SSTs) are utilized to dispense items of media to a user or via which users can deposit items of media. For example, an Automated Teller Machine (ATM) can be used to dispense currency notes to a user or allow a user to deposit checks and/or currency notes. It is known that, because users can have different physical characteristics or because users of so-called drive-through SSTs may be located in different sized vehicles, presenting a display of the terminal in a way that makes displayed information readable to a user and which is not prone to a user mistakenly selecting undesired options because of parallax effects can be problematical.

The parallax problem is particularly significant when operating touchscreens because in such devices a display panel is spaced apart by a short distance from a touch panel. As a result, if an observation point of a user is not more or less directly face on to a display, there is a risk that a user will touch a point of the touchscreen which they believe corresponds to a particular displayed option when in fact that touch point is associated with a different option when viewed from an observation point more perpendicular to the touchscreen.

Until now, prior art solutions to this problem have concentrated on physically varying an angle of tilt associated with the touchscreen of a terminal. For example, U.S. Pat. No. 7,644,039 discloses how a height and angle of tilt of a display of an ATM can be altered dependent upon pre-stored user characteristics associated with identified users. This helps orientate a screen "head on" to a user so they can see the screen clearly along a line of sight more or less perpendicular to the screen. As a result, parallax effects are eradicated or vastly reduced.

Nevertheless, the solution offered by U.S. Pat. No. 7,644,039 suffers from a number of problems. Notably, a user needs to identify themselves prior to a user display being duly located. Errors can occur during this verification procedure since the user may not be able to clearly read initially displayed information. Also, a data store in the terminal, or connected to the terminal, must be provided storing details of each possible user for recall when a particular user wishes to use a terminal. Still furthermore, the solution described in U.S. Pat. No. 7,644,039 utilizes a complicated pneumatic system for raising a height of a display and tilting the display. Such pneumatic systems are prone to error and are complicated to manufacture and maintain. Also, the degree of movement permitted according to the solution shown in U.S. Pat. No. 7,644,039 means that it is difficult to seal in a watertight manner around the moveable screen and this can permit ingress of water or other particulate matter which can, over time, cause failure.

SUMMARY OF THE INVENTION

It is an aim of the present invention to at least partly mitigate the above-mentioned problems.

It is an aim of certain embodiments of the present invention to provide a method and apparatus for accurately determining a user option that a user wishes to select at a touchscreen of an SST.

It is an aim of certain embodiments of the present invention to offset a co-ordinate scheme of a display panel of the touchscreen and/or offset a co-ordinate scheme of a touch panel of the touchscreen so that a correct identification of a desired option selected by a user is made.

It is an aim of certain embodiments of the present invention to provide a drive-through type ATM in which users at various elevations with respect to the ATM can successfully make use of a touchscreen of the user interface.

According to a first aspect of the present invention there is provided a method of determining a user option selected at a touchscreen, comprising the steps of:
  determining an observation position of a user of a touchscreen;
  determining an offset responsive to a difference between the observation position and an expected observation position; and
  determining a user option selected at the touchscreen responsive to the offset.

Aptly, the step of determining the observation position comprises the steps of determining a viewing distance between a viewing plane of the user and a touch panel of the touchscreen; and
  determining a first and second co-ordinate position of the user in the viewing plane.

Aptly, the method further comprises the steps of viewing the user of the touchscreen via at least one image sensor;
  identifying the location of at least one pre-determined feature of the user in at least one sensed image; and
  determining said an observation position responsive to the identified location.

Aptly, the step of determining the observation position comprises the steps of receiving user input information responsive to a user pressing one of a plurality of possible user location buttons at a terminal comprising the touchscreen; and
  determining an observation position associated with the selected location button.

Aptly, the step of determining the observation position comprises the steps of, via a reading device, determining at least one characteristic of the user; and
  determining said an observation position responsive to the at least one characteristic.

Aptly, the step of determining a user option comprises the steps of, determining a modified touch point by applying the offset to a point touched by the user on a touch panel of the touchscreen; and
  determining a point on a display panel of the touchscreen associated with the modified touch point.

Aptly, the step of determining a user option comprises the steps of, subsequent to the steps of determining an observation position and an offset, applying the offset to a co-ordinate scheme used to display user options on a display panel of the touchscreen;
  displaying a plurality of user options via the display panel; and
  subsequently determining a point on the touch panel of the touchscreen touched by the user and associated with one of the plurality of user options.

Aptly, the method further comprises the steps of determining a user option at a user interface, comprising a fixed touchscreen, of a Self-Service Terminal (SST).

According to a second aspect of the present invention there is provided apparatus for determining a user option selected at a touchscreen, comprising:
- a touchscreen comprising a display panel that selectively displays at least one image and a touch panel substantially parallel to and spaced apart from the display panel; wherein
- a co-ordinate scheme of the display panel and/or the touch panel is offset responsive to a difference between an observation position of a user of the touchscreen and an expected observation position to determine a user option selected at the touchscreen.

Aptly, the apparatus further comprises at least one reading device that determines the observation position of the user.

Aptly, the reading device comprises at least one of a user button, a camera, a magnetic stripe reader, a smartcard reader, a contactless card reader, an iris scan device, a retina scan device, a fingerprint reader and/or a voice recognition device.

Aptly, the reading device comprises a plurality of image sensors that provide respective and overlapping images of the user.

Aptly, the apparatus further comprises a processing module that determines an observation position of the user and an offset responsive to a difference between the observation position and the expected observation position.

Aptly, the apparatus is a drive-through Automated Teller Machine (ATM).

According to a third aspect of the present invention there is provided a product which comprises a computer programme comprising programme instructions for determining an observation position of a user of a touchscreen, determining an offset responsive to a difference between the observation position and an expected observation position and determining a user option selected at the touchscreen responsive to the offset.

Certain embodiments of the present invention provide the advantage that a user option selected at a touchscreen can correctly be identified regardless of a viewing angle of a user of a Self-Service Terminal (SST).

Certain embodiments of the present invention provide the advantage that a mapping scheme used at a touchscreen is selected according to a customer orientation.

Certain embodiments of the present invention can be used with drive-up style SSTs whilst certain other embodiments of the present invention are not limited to such use.

Certain embodiments of the present invention offer a customer of a terminal a simple-to-use scheme which either allows the customer to indicate their orientation with respect to a terminal manually, or automatically detects that orientation. A co-ordinate scheme associated with a display panel and/or touch panel of a touchscreen is adjusted accordingly to take account of any vertical or horizontal or near/far orientation of the user. The offset helps correlate a location touched on a touch panel with an option displayed on the display panel that corresponds to the touched location regardless of a particular viewer's observation point.

Certain embodiments of the present invention are applicable wherever a touchscreen is utilized and a user of that touchscreen may view the touchscreen from an observation position at an angle to a perpendicular/head on orientation. The displayed information is offset with respect to the touch panel, or the touch panel sensing system is offset with respect to normal, or a combination of both techniques are utilized to help ensure that a user option which a user believes they have selected at a touchscreen is successfully determined.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
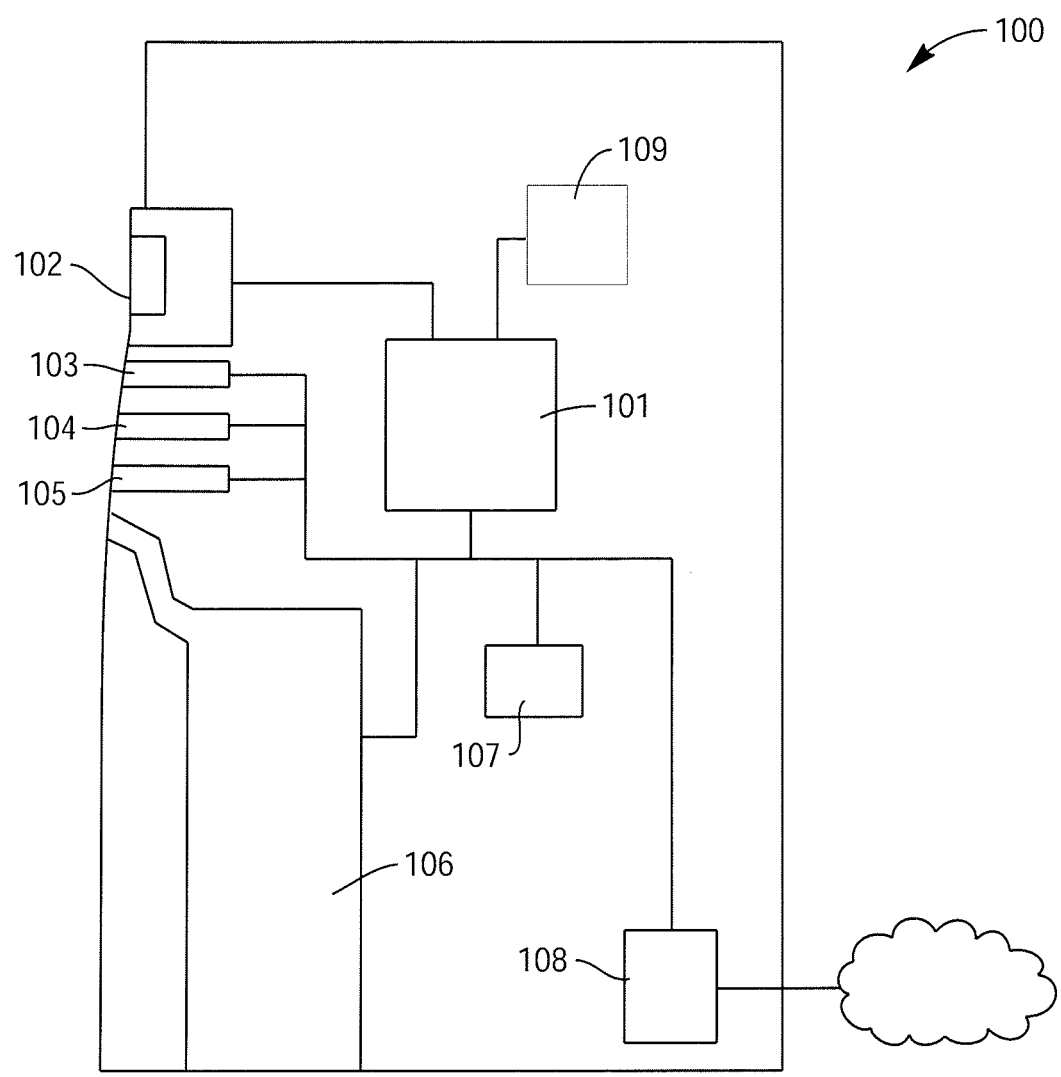
FIG. 1 illustrates an Automated Teller Machine (ATM) according to an embodiment of the present invention.

In the drawings like reference numerals refer to like parts.

FIG. 1 illustrates a block diagram of a Self-Service Terminal 100 in the form of a drive-through Automated Teller Machine (ATM) according to one embodiment of the present invention. It will be understood that certain embodiments of the present invention are applicable to other types of Self-Service Terminals (SSTs) such as ATMs, vending machines, change machines and the like.

The ATM 100 includes different modules for enabling transactions to be executed and recorded by the ATM 100. These ATM modules include customer transaction modules and service personnel modules. The ATM modules include an ATM controller 101, a customer display 102, a card reader/writer module 103, an encrypting keypad module 104, a receipt printer module 105, a cash dispenser module 106, a journal printer module 107 for creating a record of every transaction executed by the ATM, a connection module 108, an operator panel module 109 for use by a service operator (such as a field engineer, a replenisher (of currency, of printed paper or the like), or the like).

Certain customer transaction modules (such as the ATM controller 101) are also used by the service personnel for implementing management functions. However, some of the modules are referred to herein as service personnel modules (such as the journal printer module 107 and the operator panel module 109) because they are never used by ATM customers.

Figure 2:
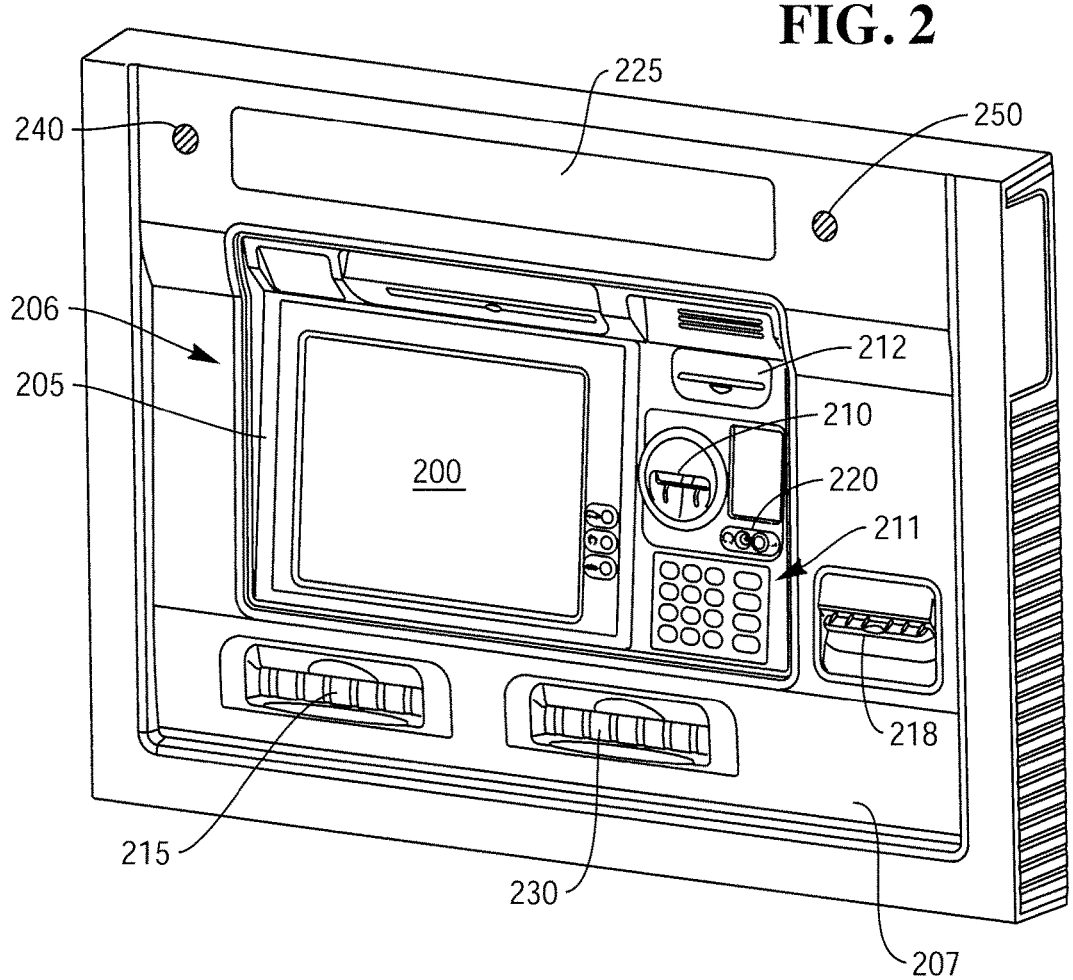
FIG. 2 illustrates the user interface of the terminal shown in FIG. 1.

FIG. 2 illustrates the primary user interface of the ATM 100 in more detail. It will be appreciated that this primary user interface is influential on the customer user experience. More and more these days the functions available, the applications/marketing and corporate branding are elevating the importance of this device and the associated performance. The user interface combines a large display area 200 provided by a touchscreen which can be utilized to provide high quality graphic and animation visualization to a user. Selection of certain displayed options can be made by a user by touching the screen at locations associated with the options. The touchscreen display includes a display panel and spaced apart touch panel as will be appreciated by those skilled in the art. The display itself is surrounded and supported in place by a frame 205. The frame extends circumferentially around the outer edge regions of the touch and display panels of the display. The frame 205 extends around the edge of the display to help define the edges of the display area and also provide a connecting area between the edges of the display panel and the aperture 206 provided in the front fascia 207 of the ATM which receives the display. The primary user interface also includes a card reader/writer slot 210 which provides an interface between the user and the card reader/writer module 103. The primary user interface also includes a keypad 211 which provides the interface between a user and the encrypting keypad module 104. The primary user interface also includes a receipt slot 212 which provides the interface between a user and the receipt printer module 105. The primary user interface also includes a cash dispenser slot 215 which provides an interface between a user and the cash dispenser module 106. The primary user interface also includes a check processing slot 218 which provides the interface between a user and a check processing module.

The primary user interface also includes a private audio port 220, illuminated signage 225 and a further cash recycler slot 230. The front fascia 207 of the ATM also includes a first opening 240 for a camera and a further opening 250 for another camera. These will be described in more detail herein below.

Figure 3:
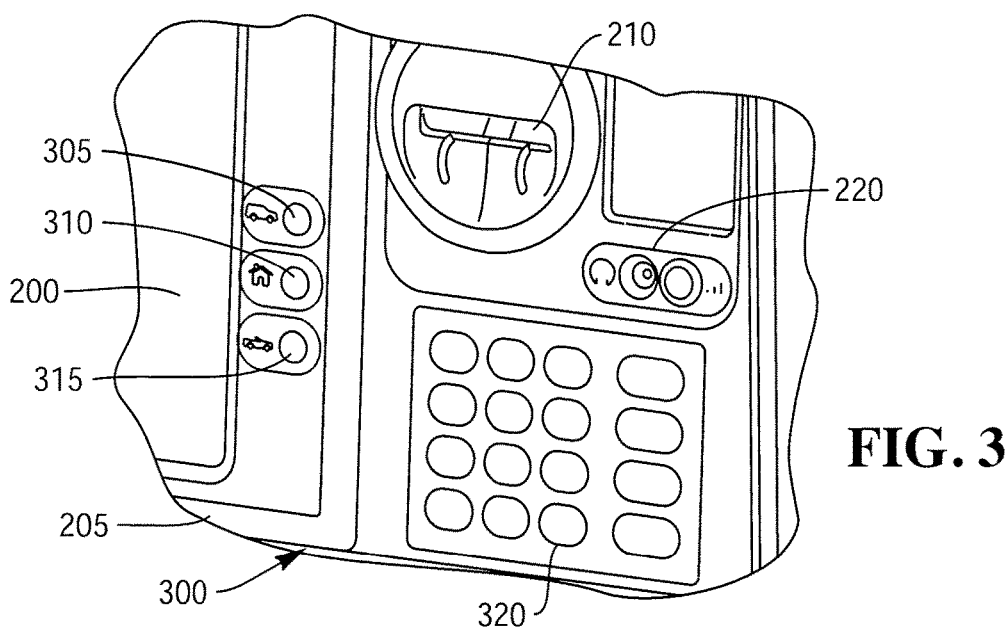
FIG. 3 illustrates a magnified view of a region of the user interface shown in FIG. 2.

FIG. 3 illustrates parts of the user interface illustrated in FIG. 2 in more detail. More particularly, FIG. 3 illustrates a corner region 300 of the display which is surrounded by the frame 205. As illustrated in FIG. 3, the frame 205 carries three user buttons. An uppermost user button 305 is an illuminated single press button which displays a visual cue in the form of a picture of a large vehicle. By pressing this button a user indicates that they are sat relatively high up in a large vehicle. Their angle of sight with respect to the display is thus more elevated than average. A central user button 310 is an illuminated single press button. This button is also accompanied by a visual cue in the form of the picture of a house/home. This button is pressed by a user to indicate that they are at an average height and therefore no offsetting will be required. The third lower button 315 is a single press illuminated button. A visual cue in the form of the picture of a low sports vehicle accompanies the button. By pressing this button a user indicates that they are viewing the ATM from an observation point below average. FIG. 3 also illustrates how the keypad 211 includes multiple alphanumeric buttons 320 which can be utilized to enter a PIN number and which can be utilized to receive further user input indicating selections.

Figure 4:
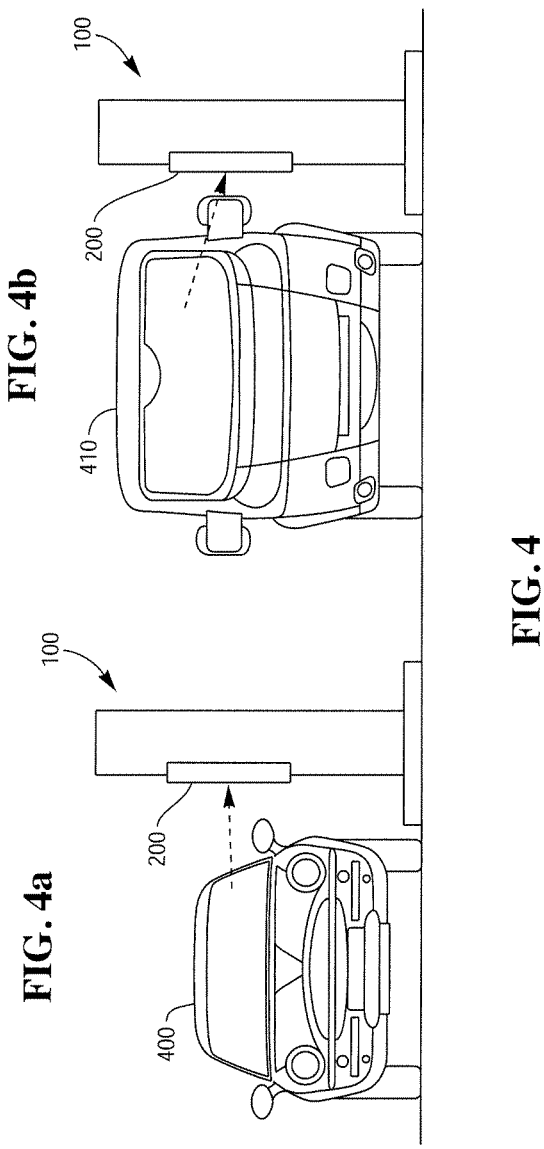
FIG. 4 illustrates different elevations of users of a fixed screen terminal.

FIG. 4 helps illustrate a drive-through ATM. More particularly, FIG. 4a illustrates how a user in a "standard" vehicle 400 is located so that the observation position of a user in the vehicle is substantially perpendicular to the plane of the touchscreen 200. By contrast, FIG. 4b illustrates how a user in a "large" vehicle 410 has an observation position higher than the user of a standard vehicle. In this sense, the viewer in the "large" vehicle views the touchscreen 200 from a point at an angle to the perpendicular to the plane of the display.

Figure 5:
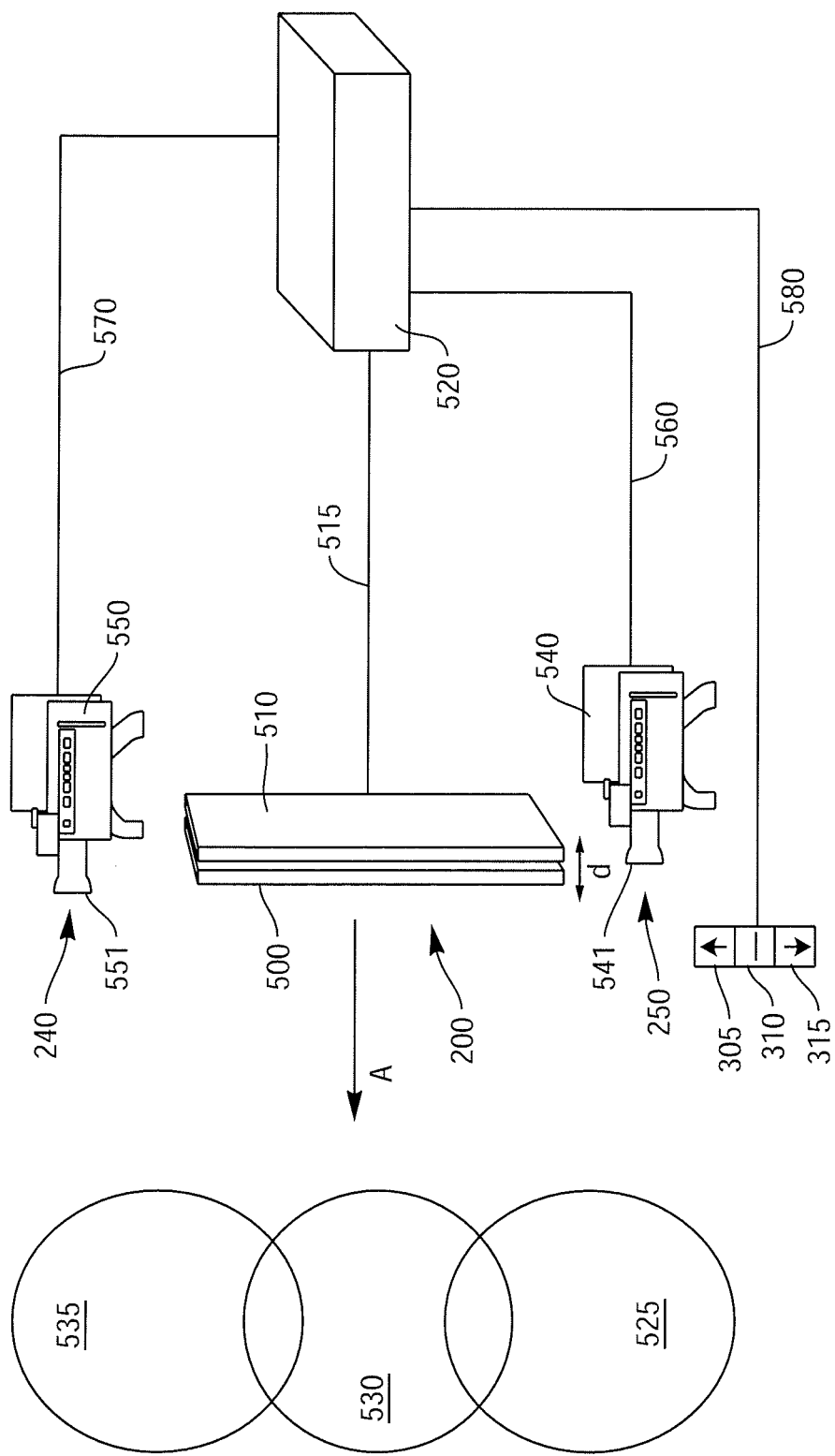
FIG. 5 illustrates how an elevation of a user may be determined automatically or manually via user input.

FIG. 5 helps illustrate how the position of a user can be determined automatically and/or by virtue of the user buttons 305, 310, 315. It will be understood that certain embodiments of the present invention can provide a terminal which has only the automatic means of height detection, or only the manual means, or a combination of automatic and manual means for determining the viewing position of a user.

As shown in FIG. 5, the touchscreen 200 includes a front transparent touch panel which is actually touched by a user and a display panel located behind the touch panel. The display panel 510 is optionally an LCD array and signals driving the pixel elements of the display panel are provided to the display panel 510 via a connection 515 from a computer 520 in the terminal. The computer 520 produces video signals which are sent to the display panel 510. The display panel 510 and the touch panel 500 are separated by a short distance d. Aptly, this space is about around five millimeters or less. Aptly, this distance is about around ten millimeters or less. Aptly, this distance is about around fifteen millimeters or less. A user viewing the display 200 may be located in various viewing zones and thus at various angles with respect to an orthogonal direction indicated by arrow A in FIG. 5. This is substantially at right angles to the plane of the touch panel 500 of the display 200. A lower viewing zone 525 would correspond to a user who is short in stature using the terminal or a user being seated in a low-down sports car type vehicle. Alternatively, a user may be in a normal viewing zone 530 corresponding to a user being of average height or being seated in a normal "standard" vehicle. Observation points within this normal viewing zone lead to a small viewing angle. That is to say, observers will look at the touch panel 500 substantially head on. Viewers located in an elevated viewing zone 535 may be tall individuals or may be individuals sat in high vehicles. Such individuals will view the touch panel at an angle to the perpendicular.

A user may indicate which of the viewing zones they are in, either manually by pressing a corresponding user button 305, 310, 315, or by automatic detection utilizing a first camera 540 and a further camera 550 which have corresponding viewing lenses 541, 551 visible at the front of the fascia of the terminal through respective openings 240, 250. The two cameras provide for stereoscopic determination of an actual viewing angle. The first camera provides a first respective image to the computer 520 via a respective connection 560. The further camera 550 provides an image to the computer 520 via a respective connection 570. Inputs from the user button are connected to the computer 520 via a respective connection 580. The computer 520 in the terminal determines which of the three viewing zones a viewer is located in responsive to the manual input of that information via the user buttons or by image analysis of the two images of the user which are taken simultaneously by the two cameras and which utilize conventional image processing techniques to determine the location of the user in the image and/or a distance of that user away from the touchscreen panel 500. For example, the processing of images for eye level identification have been developed as part of facial recognition systems. For example, see Ramzi Abiantun, Marios Savvides, Pradeep K. Khosia, "Automatic Eye-Level Height System for Face and Iris Recognition Systems", Automatic Identification Advanced Technologies, IEEE Workshop on, pp. 155-159, Fourth IEEE Workshop on Automatic Identification Advanced Technologies (AutoID'05), 2005Automatic eye-level height system for face and iris recognition systems and Wang, Q., 2004. Automatic eye detection in facial images with unconstrained backgrounds. Pattern Recognition, 1(1), p.55-62. Available at: http://hdl.handle.net/2086/849. These references are incorporated herein by reference.

Figure 6:
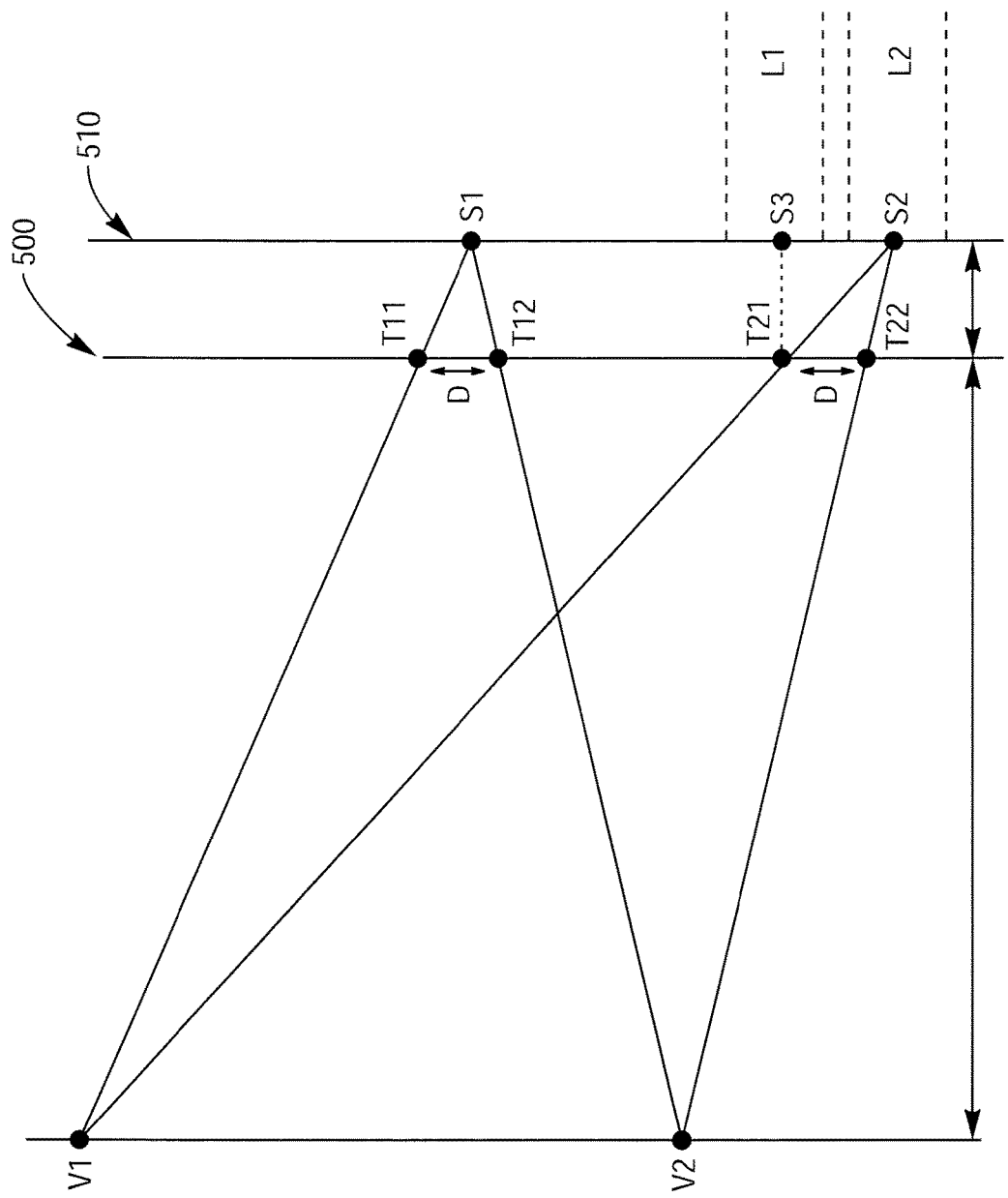
FIG. 6 illustrates adjustment of a co-ordinate system.

FIG. 6 helps illustrate how a co-ordinate scheme of a touch panel or display panel or touch panel and display panel can be offset to account for a user's observation position according to an embodiment of the present invention. As shown in FIG. 6, V1 is the viewing point designed to give best alignment between the touch panel 500 and display panel 510. S1 and S2 are arbitrary locations on the display panel. These may be actual points or indicate regions of the touch panel where certain option buttons are displayed. T11 and T21 are actual touch points associated with S1 and S2 when seen form V1. V2 is a viewing point of a user displaced from the optimum view point. This corresponds to the user being more or less elevated than a home position. A vertical displacement from the optimum viewpoint to position V2 causes the touch point which a user actually touches on the touch panel to move from T11 to T12 with regard to point Si and from point T21 to point T22 with respect to the position S2. The imaginary point S3 corresponds to a point on the display panel 510 which a user observing from V1 would be selecting if they were to touch the touch panel at position T21. It will be understood that if the area around position S3 corresponded to an option different from the option corresponding to the region at S2, then pressure on the point T21 would indicate that a user wished to select the option associated with location S3. This could lead to an erroneous user option being determined. To avoid this, once the position of a user is determined an offset can be applied to the touch panel co-ordinate scheme (or the display co-ordinate scheme prior to user selection). From similar triangles it can be seen that the distance from T11 to T12 and from T21 to T22 are the same. Therefore a simple vertical shift of distance D to the touch screen co-ordinates can compensate for the change in viewpoint. The vertical shift in touch co-ordinates is proportional to the distance between the two viewpoints.

A first zone L1 shown in FIG. 6 represents the limits of adjacent touch area associated with an option different from S2. A further zone L2 represents limits of touch area associated with S2.

Figure 7:
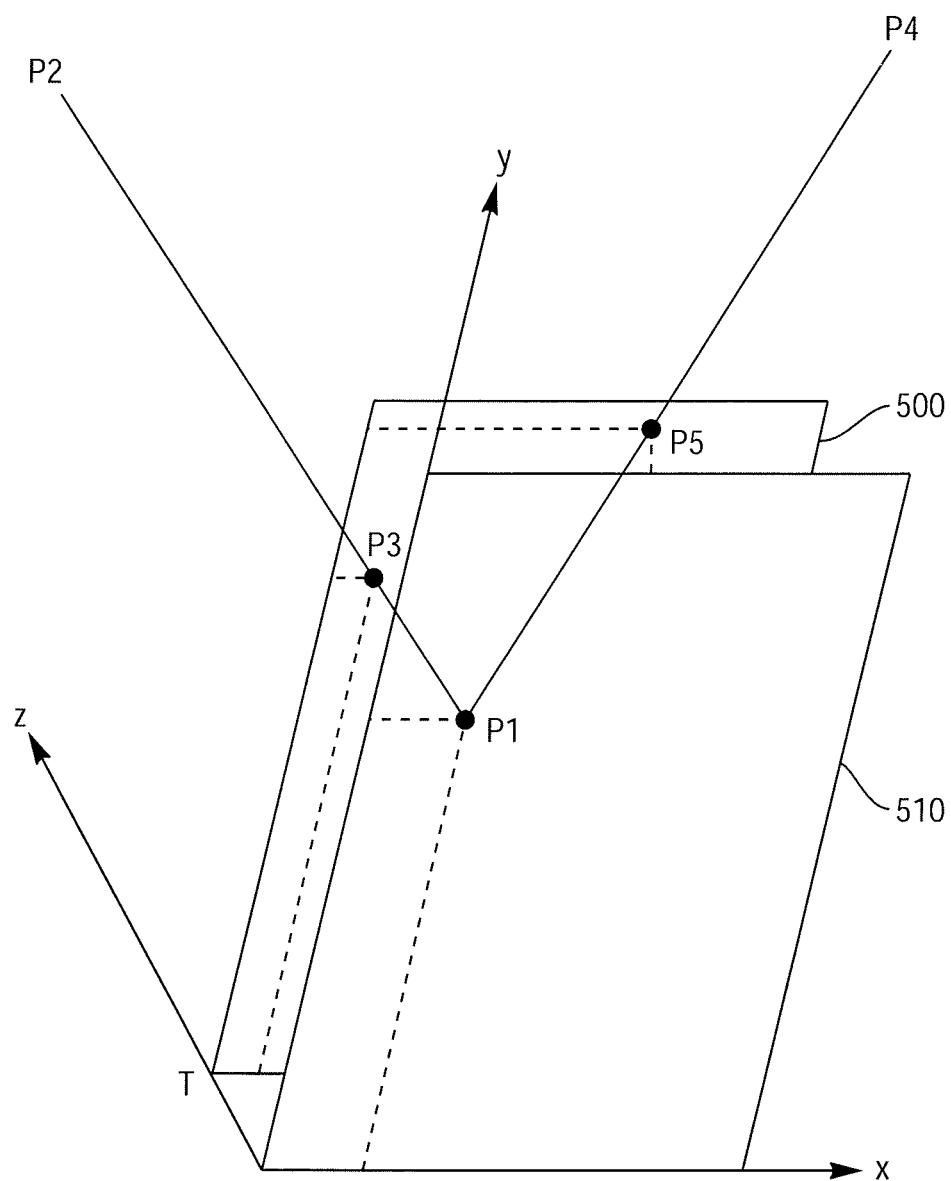
FIG. 7 illustrates adjustment of a co-ordinate system.

It will be understood that the offsetting scheme illustrated in FIG. 6 assumes that the observation point of the user is always in a similar plane. By contrast, FIG. 7 illustrates an offsetting scheme according to certain embodiments of the present invention in which a distance of an observer/user of the ATM is also variable. Assuming any point P on a line in 3D space can be represented by the form P=P1+k(P2−P1) where P1 and P2 are points on the line and k is a real number. Let a point on a display 510 be P1 as viewed from two different viewpoints P2 and P4. Then let P3 and P5 represent the points that the viewing line intersects the touchscreen 500. Then we know:

$$P3 = P1 + k1(P2-P1) \quad 1.1$$

$$P5 = P1 + k2(P4-P1) \quad 1.2$$

Setting the co-ordinate system such that the display is in the plane z=0 and the touchscreen is in the plane z=T where T is the distance between the touchscreen and the display, then:

$$x_3 = x_1 + k_1(x_2-x_1) \ x_5 = x_1 + k_2(x_4-x_1)$$

$$y_3 = y_1 + k_1(y_2-y_1) \ y_5 = y_1 + k_2(y_4-y_1)$$

$$z_3 = z_1 + k_1(z_2-z_1) \ z_5 = z_1 + k_2(z_4-z_1)$$

Given $z_1=0$ & $z_3=z_5=T$ then $k_1=T/z_2$ and $k_2=T/z_4$ $$x_3 = x_1 + T(x_2-x_1)/z_2 \ x_5 = x_1 + T(x_4-x_1)/z_4$$

$$y_3 = y_1 + T(y_2-y_1)/z_2 \ y_5 = y_1 + T(y_4-y_1)/z_4$$

It is to be noted that for the special case of a vertical display with a fixed distance Z to the viewpoint, then:

$$x_5 = x_3 + T(x_4-x_2)/Z$$

$$y_5 = y_3 + T(y_4-y_2)/Z$$

If the effective touch area seen from P2 is $[(x_{TopLeft}, y_{TopLeft}), (x_{BottomRight}, y_{BottomRight})]$ then from P4 this would become $$[x_{TopLeft}+k_x, y_{TopLeft}+k_y), (x_{BottomRight}+k_x, y_{BottomRight}+k_y)]$$

Where constants $k_x=T(x_4-x_2)/Z$ and $k_y=T(y_4-y_2)/Z$

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of determining a user option selected at a touchscreen, comprising the steps of:
   determining an observation position of a user of a touchscreen fixed and integrated into a Self-Service Terminal (SST), the observation position at least partially determined as a viewing angle of the user relative to the touchscreen while the user is seated in a vehicle at the SST, and using two cameras for stereoscopic determination of the viewing angle of the user relative to the touchscreen while the user faces the touchscreen by taking a first image from a first one of the cameras that is situated below the touchscreen and taking a second image from a second one of the cameras that is situated above the touchscreen and merging the first and second images into a merged image for determining the viewing angle, and identifying the viewing angle as corresponding to one of: a lower viewing zone corresponding to the user being short in stature relative to the touchscreen while seated in the vehicle, a normal viewing zone corresponding to the user being average in statute relative to the touchscreen while seated in the vehicle, and an elevated viewing zone corresponding to the user being taller in stature relative to the touchscreen while seated in the vehicle;
   determining an offset responsive to a difference between the observation position and an expected observation position; and determining a user option selected at the touchscreen responsive to the offset based on the user interacting with the touchscreen that is integrated into and physically part of the SST.

2. The method as claimed in claim 1, wherein the step of determining said an observation position comprises the steps of:
   determining a viewing distance between a viewing plane of the user and a touch panel of the touchscreen; and
   determining a first and second co-ordinate position of the user in the viewing plane.

3. The method as claimed in claim 1, further comprising the steps of:
   viewing the user of the touchscreen via at least one image sensor;
   identifying the location of at least one pre-determined feature of the user in at least one sensed image; and
   determining said an observation position responsive to the identified location.

4. The method as claimed in claim 1, wherein the step of determining said an observation position comprises the steps of:
   receiving user input information responsive to a user pressing one of a plurality of possible user location buttons at a terminal comprising the touchscreen; and
   determining an observation position associated with the selected location button.

5. The method as claimed in claim 1, wherein the step of determining said an observation position comprises the steps of:
   via a reading device, determining at least one characteristic of the user; and
   determining said an observation position responsive to the at least one characteristic.

6. The method as claimed in claim 1, wherein the step of determining a user option comprises the steps of:
   determining a modified touch point by applying the offset to a point touched by the user on a touch panel of the touchscreen; and
   determining a point on a display panel of the touchscreen associated with the modified touch point.

7. The method as claimed in claim 1, wherein the step of determining a user option comprises the steps of:
   subsequent to the steps of determining an observation position and an offset, applying the offset to a co-ordinate scheme used to display user options on a display panel of the touchscreen;
   displaying a plurality of user options via the display panel; and
   subsequently determining a point on the touch panel of the touchscreen touched by the user and associated with one of the plurality of user options.

8. Apparatus for determining a user option selected at a touchscreen, comprising:
   a touchscreen comprising a display panel that selectively displays at least one image and a touch panel substantially parallel to and spaced apart from the display panel, wherein the touchscreen is fixed and integrated into a Self-Service Terminal (SST) and the touchscreen is physically part of the SST; wherein
   a co-ordinate scheme of the display panel and/or the touch panel is offset responsive to a difference between an observation position of a user of the touchscreen and an expected observation position to determine a user option selected at the touchscreen and the observation position at least partially resolved as a viewing angle of the user relative to the touchscreen while the user is seated in a vehicle at the SST and facing the touchscreen of the SST, and the viewing angle resolved by stereoscopic determination from two cameras by taking a first image from a first one of the cameras that is situated below the touchscreen and taking a second image from a second one of the cameras that is situated above the touchscreen and merging the first and second images into a merged image for determining the viewing angle, and wherein the viewing angle corresponds to one of: a lower viewing zone corresponding to the user being short in stature relative to the touchscreen while seated in the vehicle, a normal viewing zone corresponding to the user being average in statute relative to the touchscreen while seated in the vehicle, and an elevated viewing zone corresponding to the user being taller in stature relative to the touchscreen while seated in the vehicle, wherein the user interacts with the touchscreen to select the user option.

9. The apparatus as claimed in claim 8, further comprising:
   at least one reading device that determines the observation position of the user.

10. The apparatus as claimed in claim 9, further comprising:
    the reading device comprises at least one of a user button, a magnetic stripe reader, a smartcard reader, a contactless card reader, an iris scan device, a retina scan device, a fingerprint reader and/or a voice recognition device.

11. The apparatus as claimed in claim 9, further comprising:
    the reading device comprises a plurality of image sensors that provide respective and overlapping images of the user.

12. The apparatus as claimed in claim 8, further comprising:
    a processing module that determines an observation position of the user and an offset responsive to a difference between the observation position and the expected observation position.

13. The apparatus as claimed in claim 8, wherein the SST is a drive through Automated Teller Machine (ATM).

* * * * *